INVENTOR.
WILLIAM R. BLAIR

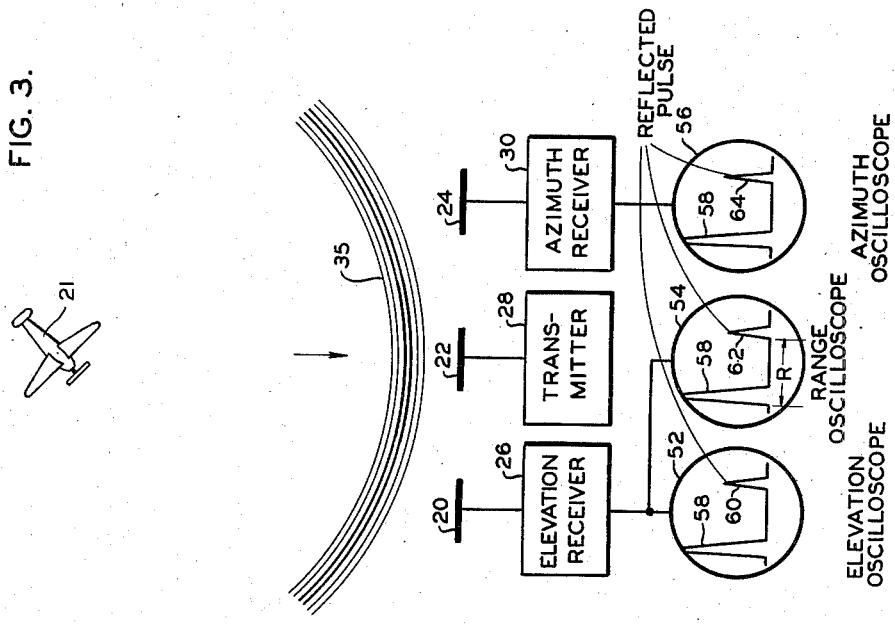
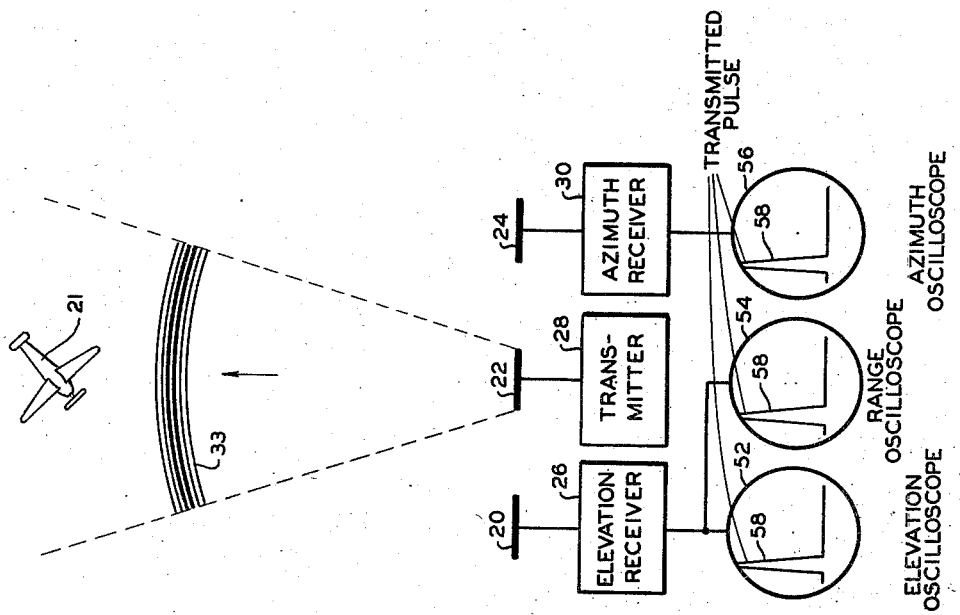

INVENTOR.
WILLIAM R. BLAIR
BY
ATTORNEY

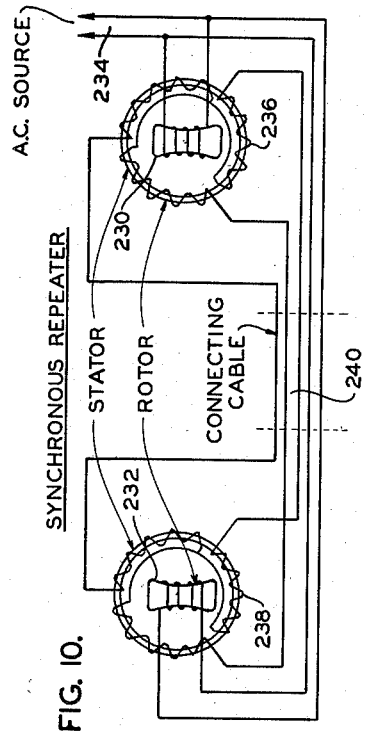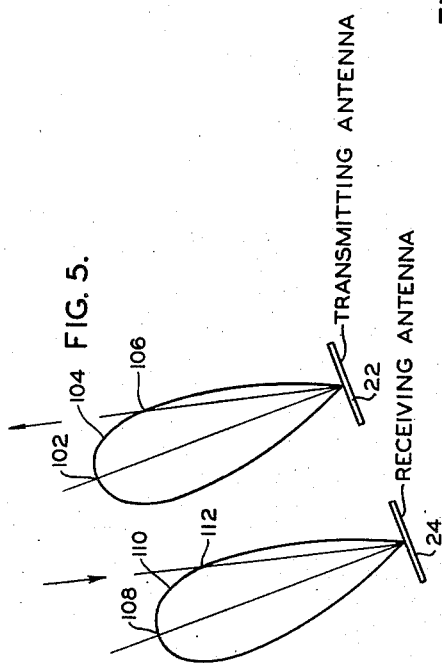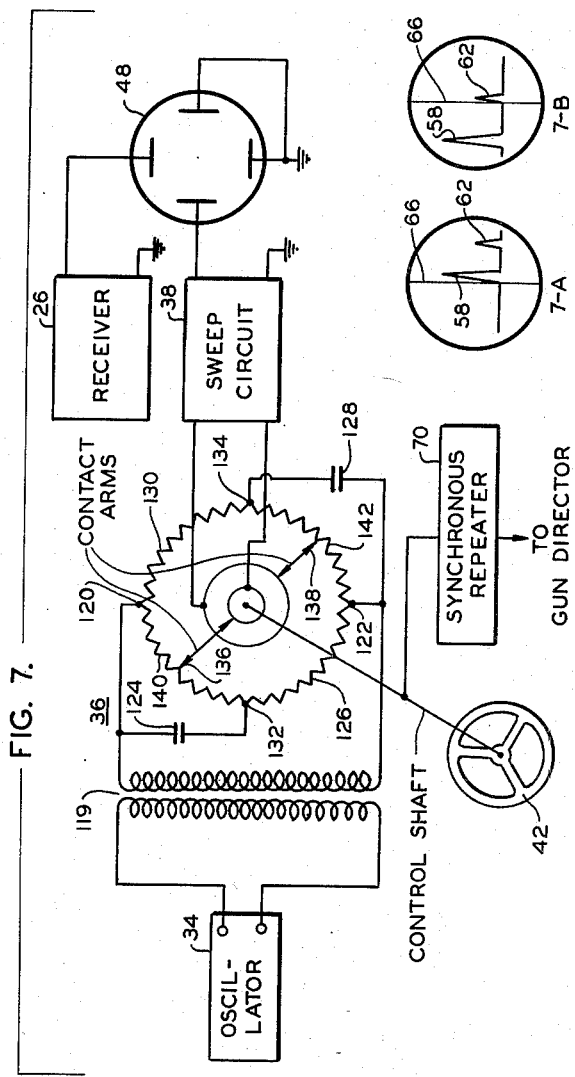

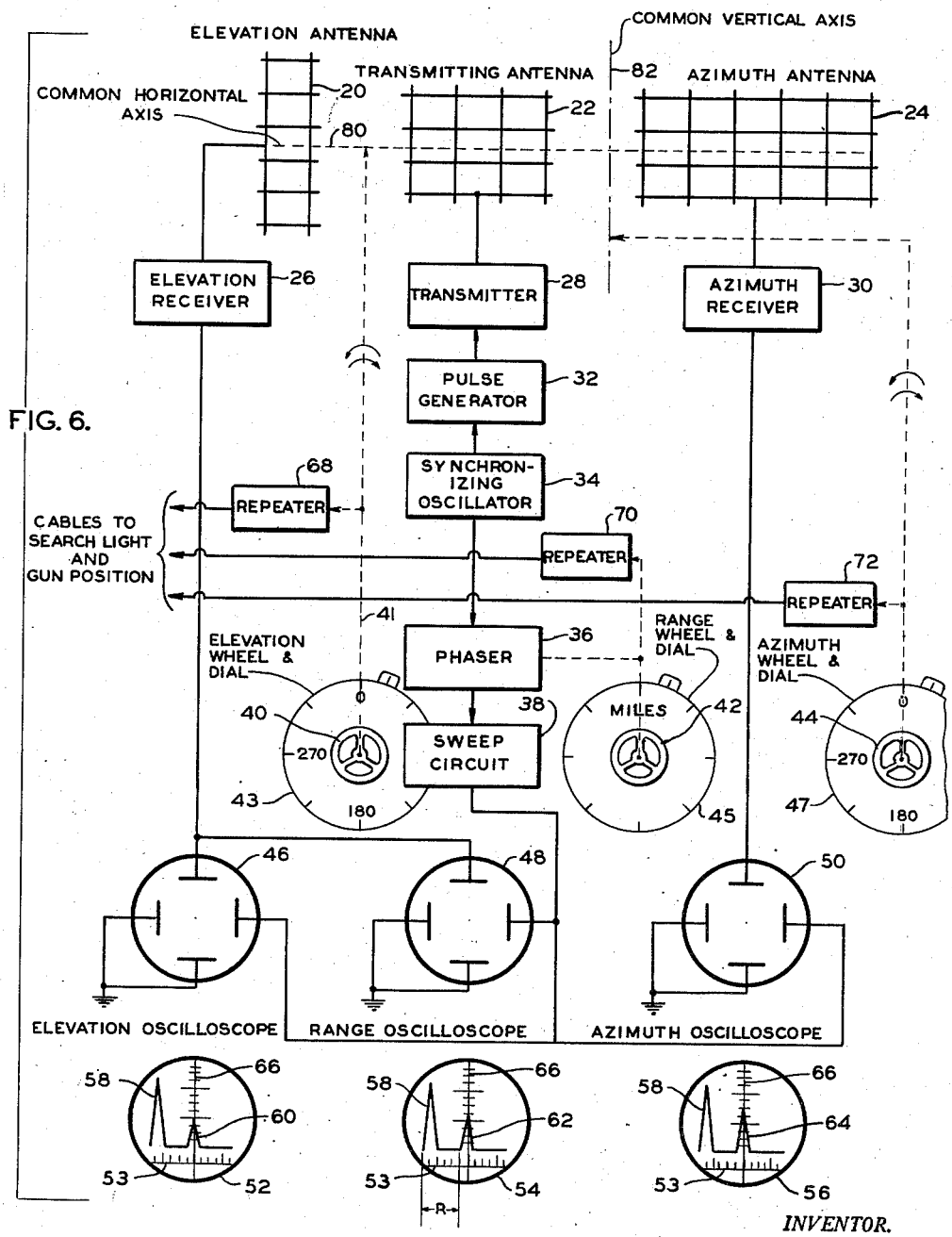

Aug. 20, 1957 W. R. BLAIR 2,803,819
OBJECT LOCATING SYSTEM
Filed June 7, 1945 6 Sheets-Sheet 6
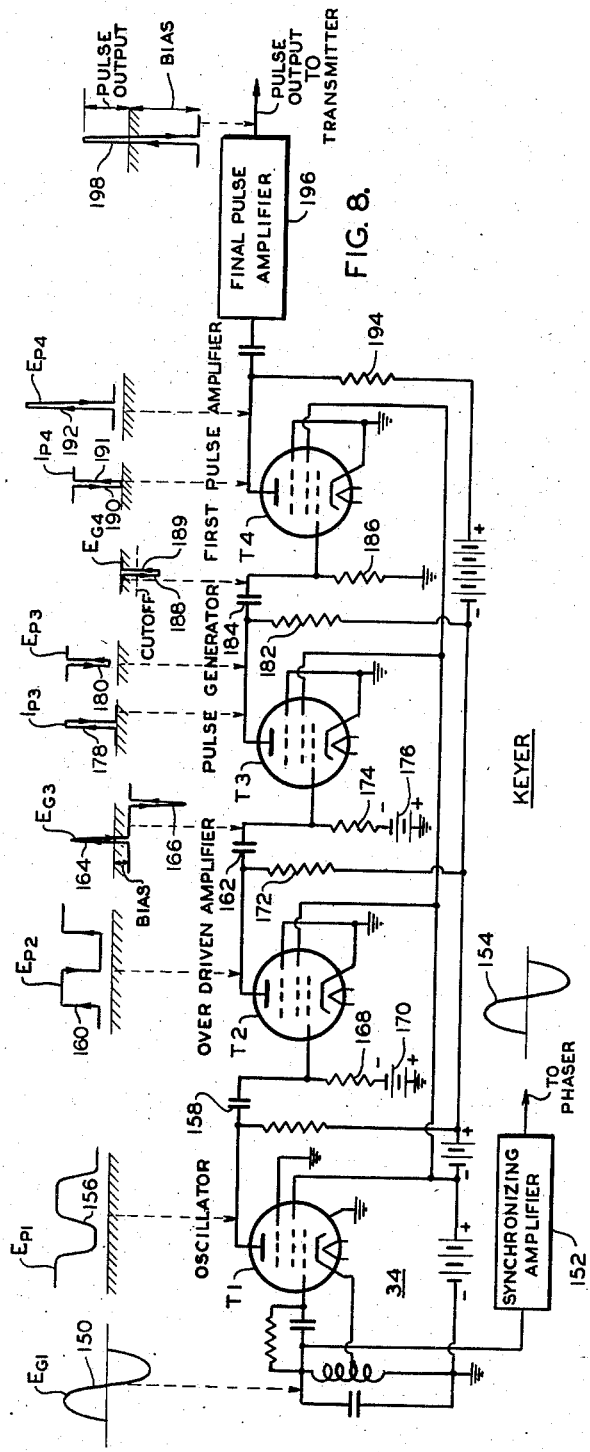
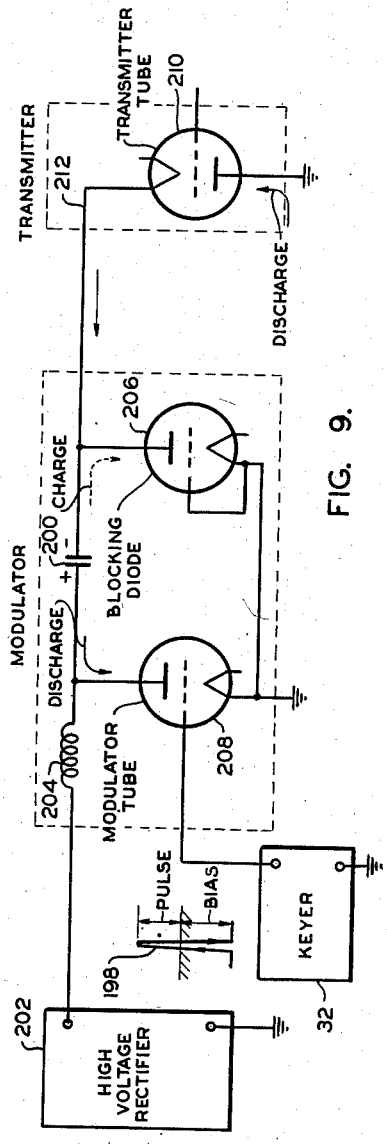
*INVENTOR.*
WILLIAM R. BLAIR
BY
*William D. Hall*
ATTORNEY United States Patent Office 2,803,819
Patented Aug. 20, 1957

2,803,819

OBJECT LOCATING SYSTEM

William R. Blair, Washington, D. C.

Application June 7, 1945, Serial No. 598,167

27 Claims. (Cl. 343—11)

(Granted under Title 35, U. S. Code (1952), sec. 266)

The invention described herein may be manufactured and used by or for the Government for governmental purposes, without the payment to me of any royalty thereon.

This invention relates to a radio system comprising transmitting and receiving elements for the location of distance objects.

More particularly, the invention relates to a method and means for determining the position of distant objects by means of reflected radio waves, and the detection or discovery of the presence of invisible objects, such as enemy aircraft, and the determination of their position in range and direction with sufficient rapidity and accuracy as to be of immediate use, such as to anti-aircraft gunners.

The invention solves the problem of aircraft detection and the instantaneous determination of aircraft position in flight, the effective range of the system depending on the amount of power provided in the transmitter. It is unaffected by weather conditions, functioning satisfactorily in daylight or darkness, fog, smoke, mist or rain. It may be utilized as part of a system of coast defense, to give early warning of the approach of distant enemy air forces, and to determine the range and position of these forces in time to permit the dispatch of fighter aircraft for their interception.

It may also be used at shore stations for the detection and location of enemy ships not optically visible because of smoke, fog, mist or darkness, and aboard ship to detect and find the position of enemy ships and aircraft, and as an aid to navigation under conditions of poor or no visibility.

In the prior art the detection of aircraft or other objects has been attempted by means of the "sound locators" and the "thermal locators" both of which had reached a fairly high state of perfection. The sound locator, utilizing the sound waves produced by aircraft as a means for detection and tracking, suffers from the fatal defect of being able at best to point only in the direction of the moving plane, the direction obtained with the sound locator always lagging behind the actual instantaneous location of any fast moving target because of very low velocity of sound.

The thermal locator utilizes the radiant heat generated by an object. It employs a large mirror of the searchlight type which brings these heat waves to a focus on a cell sensitive to infra-red radiation. This device also suffers from a fatal defect of being inoperative in smoke, mist or fog. Moreover, both sound and infra-red radiation locators have extremely poor accuracy and very limtied range, and are incapable of measuring the distance between the object and the locator.

Attempts have also been made to use radio waves for determining the presence of moving objects by using interference phenomena and the reflective properties of radio waves, but these methods have not reached a state of required perfection.

The phenomenon of reflection of radio waves has been known since the original work of Hertz and has been under constant scrutiny and observation during the general evolution of the radio art. Thus it was observed that a ship or airplane moving in the vicinity of a receiver tuned to a distant transmitter, caused variations in the intensity of the received signal and that these variations were related to the speed of the ship or plane. The effects were recognized as being due to interference between the direct ray from the distant transmitter and that reflected from the ship or plane.

The interference between the direct transmitted ray and the reflected ray, led to the interference method of plane detection such as disclosed in the Taylor Patent 1,981,884. This method, while successful in detecting the presence of a moving plane in the general vicinity of the apparatus, was incapable of giving information as to its direction or range and was therefore of no value to anti-aircraft gunners. Accordingly, the method was unsuitable for determining the location of targets.

A method of measuring distances by reflected radio waves was disclosed in Lowy patent 1,585,591. In this method the flow of transmitted radiation is interrupted or broken up into equal "on" and "off" intervals, the receiver being inactive during intervals of transmission and active during the "off" intervals. The frequency of interruption is so adjusted that the wave trains received after reflection by the distant object just fill in the spaces or time intervals between periods of transmission. When so adjusted the reading of a meter measuring the receiver output is a maximum. From this data, knowing the velocity of propagation of the radio waves, the distance of the reflecting object can be calculated. This method is quite impractical, in the form disclosed in the patent, for the practical detection and location of enemy aircraft.

Still another method of measuring distance by reflected radio waves, known as the "pulse echo" method, was developed and used by Breit and Tuve in their measurement of the height of the Heaviside layer ("Physical Review" vol. 28, page 554). In this method, the transmitted radiation is also keyed to produce "on" and "off" intervals, but the "on" and "off" periods, instead of ebing of equal duration, as in the Lowy method, the transmitting or "on" interval is very short, while the silent or receiving interval is relatively long.

These short pulses, after reflection by the Heaviside layer, arrive at the receiver where they are applied to the deflecting plates of a cathode ray oscilloscope, and the distance or range of the Heaviside layer is shown directly on the face of the oscilloscope as the spacing between the transmitted and the received pulses. This spacing is a measure of the time required for the pulse to travel from the transmitter to the object and back to the receiver, and is therefore a measure of distance. With this arrangement, the necessity for varying the pulsing frequency, as in the Lowy method, to make the received pulse fall exactly in the interval between two transmitted pulses is avoided.

While the "pulse-echo" method of measuring distance as developed by Breit and Tuve offers a practical method for determining the height of a large general object such as the Heaviside layer, it does not solve the problems encountered in the detection of aircraft and other distant objects where azimuth, elevation and range determinations are required.

A basic feature of this invention is the use of a pulsed, directional transmitter and of a directional receiver located at a common location for direction finding. Because of intermittent transmission of the exploratory pulses and their relatively short duration, the receiver which is positioned in the direct vicinity of the transmitter and is thus subjected to the influence of the powerful transmitting pulses, is nevertheless capable of regaining sufficient sensitivity to detect the relatively minute amounts of energy reflected by the target and this reflected energy or echo is used for determining the direction of the reflected signal. Moreover, because of the short duration of the exploratory pulses, it becomes possible to measure not only the direction but also the slant range, resulting in the evolution of a radio object-locating system capable of determining simultaneously azimuth, elevation and slant range of an object.

According to the invention, a powerful pulse of radio frequency energy is radiated by a highly directional antenna. If the transmitted wave strikes an object capable of reradiating these waves, they will be reflected, in part, back to the source. This echo pulse on its return to its source ordinarily has sufficient energy to produce an observable effect in a suitable receiver located in the vicinity of the original source of radio energy. The effect consists of visual indications on a cathode ray oscilloscope in a form of vertical peaks projecting upward from a horizontal base line, these visual indications, together with the positioning of the antenna and of a range phase-shifter, are utilized for determining the azimuth, elevation and slant range of the object. The transmission and reception is controlled by a synchronizing master oscillator which keys the transmitter and simultaneously controls the generation of a sawtooth wave which displaces the beam of a cathode ray oscilloscope along one coordinate, thus generating a timing trace or locus, the zero time of the trace being adjustable relative to the zero time of the transmitted pulse. The received echo pulses are impressed upon the oscilloscope so as to deflect the trace along a second coordinate and thus produce peaked images projecting from the trace. The range is determined by measuring the time which elapses between the transmission of an exploratory pulse and the reception of the echo signal, the position of the image of the echo signal along the timing trace indicating the time required for the transmitted pulse to reach the object and for the reflected echo to reach the receiver. The actual measurement of the interval of time elapsed between the time of the transmission of the pulse and the reception of the echo signal is measured by means of electrical timing oscillations which are used for positioning the desired echo with respect to a reference line on the screen of the oscilloscope. This is accomplished by means of a phase shifter which is calibrated in terms of linear distance or slant range to the target. The calibration is made possible because of the constant and known velocity of propagation of the radio waves which travel with the velocity of light, i. e., 186,000 miles per second.

In order to obtain the direction in azimuth and elevation of the selected target, the transmitting and receiving antennas are made highly directional and movable in unison at the same location. Proper orientation of the lobe axes of the elevation and azimuth antennas is accomplished by observing the amplitude of the images of the echo signal appearing on the screens of the azimuth and elevation oscilloscopes connected to the azimuth and elevation receivers, respectively. When the amplitude of the received signals is maximum, the image produced on the oscilloscope screen has a maximum amplitude and this amplitude of the image is used for determining whether the axis of the lobe points directly at the selected object. Properly calibrated dials give readings in terms of the angles of elevation and azimuth of the target. These azimuth elevation and range determinations are transmitted to a gun position or a gun direction where they are used for pointing the gun toward the target or to provide appropriate data for the orientation of the gun by the gun crew.

It is therefore an object of this invention to provide a radio object-locating system capable of giving instantaneous indications of azimuth, elevation and range of an echo-producing object.

It is another object of this invention to provide a radio object-locating system capable of following a moving target and giving continuous flowing data relating to the azimuth elevation and slant range of a moving target.

Still another object of this invention is to provide a radio object-locating system having a transmitting channel equipped with a highly directional antenna which is capable of transmitting highly directional exploratory pulses, the duration of which is in the order of microseconds.

An additional object of this invention is to provide a radio object-locating system having a transmitting channel and two receiving channels, one of the receiving channels being capable of determining the azimuth of targets, the other channel, the elevation of targets, and an additional channel connected to one of the receiving channels for determining the slant range of the targets.

Still another object of this invention is to provide a radio object-locating system having transmitting and receiving channels connected to a synchronizing master oscillator which is used for keying the transmitting channel and for timing the operation of the receiving channels so as to make possible the determination of the azimuth, elevation, and slant range of the desired targets.

An additional object if this invention is to provide a radio object-locating system in which range determinations are obtained by keying the transmitting channel with the aid of synchronizing oscillator and by controlling the sweep circuit of the range determining channel with the aid of a phase shifter interposed between the synchronizing oscillator and the sweep circuit of the oscilloscope in the range channel.

Yet another object of this invention is to provide a radio object-locating system in which azimuth and elevation of targets is obtained with the aid of highly directional elevation and azimuth antennas connected to the elevation and azimuth receivers respectively, the output of the respective receivers being connected to the elevation and azimuth oscilloscopes which are capable of indicating on their screens, the positions of the lobe axes of the antennas with respect to the targets.

Still another object of this invention is to provide a radio object-locating system capable of determining slant range, elevation, and azimuth of moving targets and for transmitting this data automatically to a gun director and the guns connected to the gun director.

Another object of this invention is to provide a system for determining the direction of an object in which use is made of a highly directive pulse transmitter as well as a highly directive pulse receiver both adjustable in direction simultaneously and in the same sense at the same location, thereby to provide increased directivity and thus improve the signal-to-noise ratio.

The novel features which I believe to be characteristic of my invention are set forth with particularity in the appended claims. My invention itself, however, both as to its organiaztion and method of operation, together with the further objects and advantages thereof, may best be understood by reference to the following description taken in connection with the following drawings in which:

Figure 1 is a perspective view illustrating the radio object-locating system in actual use in the field for aircraft detection and connections between the radio object-locating system and the gun director, the guns, and a searchlight, Figure 2 and 3 are simplified block diagrams of the radio object-locating system, Figure 4 is a perspective view on an enlarged scale of the radio object-locating system illustrated in Fig. 1, Figure 5 illustrates the lobe patterns and the directive properties of the transmitting and receiving antennas, Figure 6 is a block diagram of the radio object-locating system illustrated in Figs. 1 and 4, Figure 7 is a partially block and partially schematic diagram of the range determining channel of the radio object-locating system and connections between the range channel and the gun director;

Figure 8 is the schematic diagram of a keyer used for keying the modulator illustrated in Fig. 9;

Figure 9 is the schematic diagram of the modulator and the connections between the modulator and the transmitter, and Figure 10 illustrates the connections of a synchronous repeater utilized in transmitting the elevation azimuth and the range data obtained with the radio object locator to any distant point such as gun director, searchlight or gun batteries.

Figure 1:
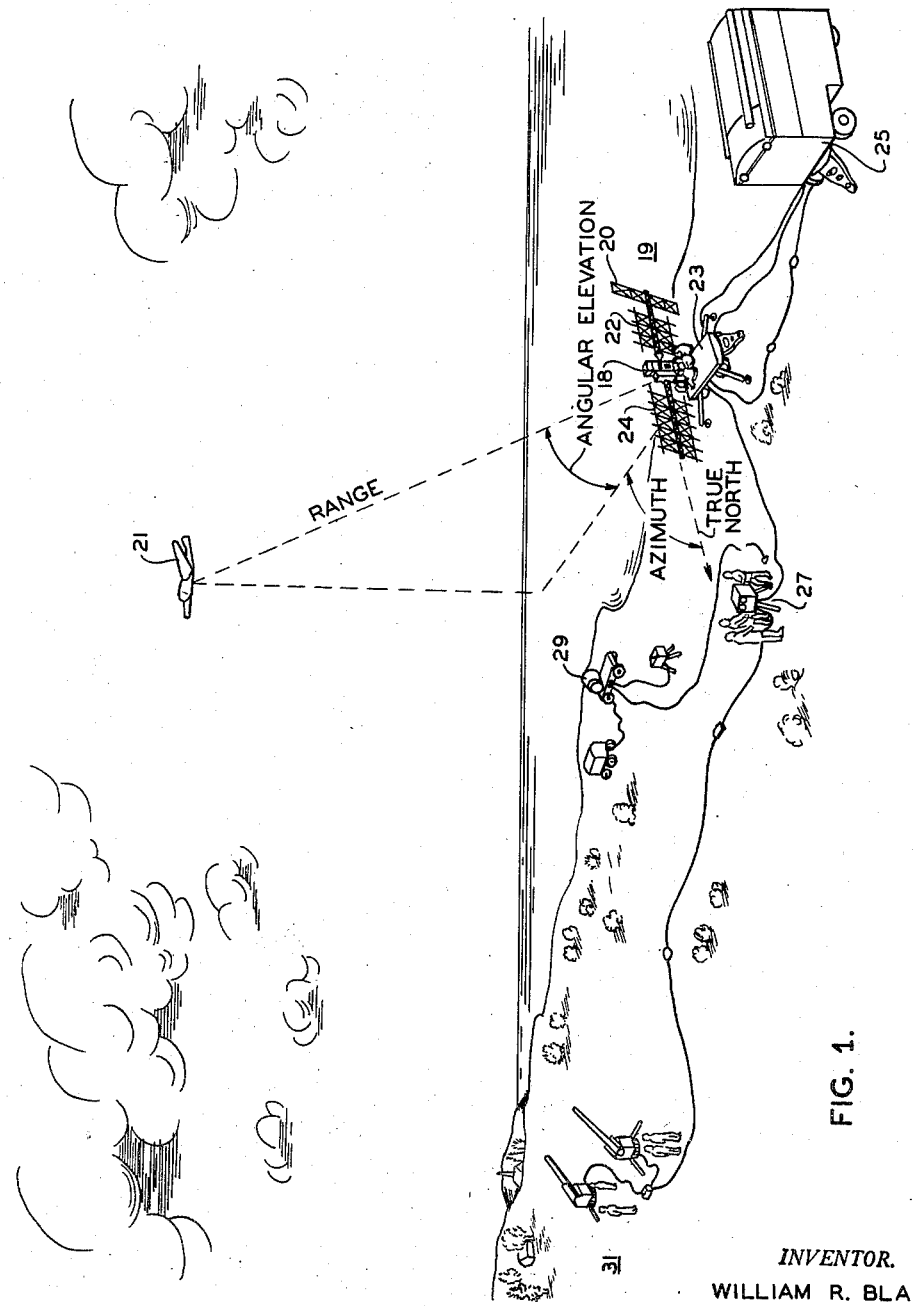

Referring to Fig. 1, a radio system embodying the invention is indicated generally at 19. An airplane 21 is shown in the beam of exploratory pulse radiation projected from a transmitting antenna 22. The train of the exploratory pulses of U. H. F. radio energy, after reflection by the plane, are received by two separate directional antennas 20 and 24 especially designed to permit accurate determination of the position of the plane in altitude and azimuth respectively. The entire detecting and position determining device including transmitter, receiver, oscilloscopes, antenna arrays and synchronous repeaters is mounted in a suitable housing 18 on the platform of a motor truck 23 for mobility. The necessary power is supplied by a separate power unit carried in a motor truck body 25. The derived data, which includes range, altitude and azimuth, are transmitted continuously and automatically by synchronous repeaters or other suitable means to the gun director 27, searchlight 29, and antiaircraft gun battery 13, through suitable cable connection and motors, as indicated in the figure.

The return of the pulse after reflection by airplane 21 is indicated at 35, in Fig. 3. The returning pulse excites the directional receiving antenna arrays 20 and 24 which energize an elevation receiver 26 and an azimuth receiver 30, respectively. After amplification and rectification the output voltages of the respective receivers are applied to the deflecting plates of cathode ray oscilloscopes 52, 54 and 56 where the received pulses are displayed on the oscilloscope screens as indicated at 60, 62 and 64 respectively.

Because of large power of the transmitted pulse and the proximity of the transmitting and receiving antennas, the transmitted pulse produces large off-scale deflections 58 on all three oscilloscopes. The received pulse, being delayed by the time required to travel the distance from the transmitter to the plane and back to the receivers, is displaced a distance R on all three oscilloscopes. This displacement is a measure of the range and is measured on the range oscilloscope by a method to be described later.

Figure 4:
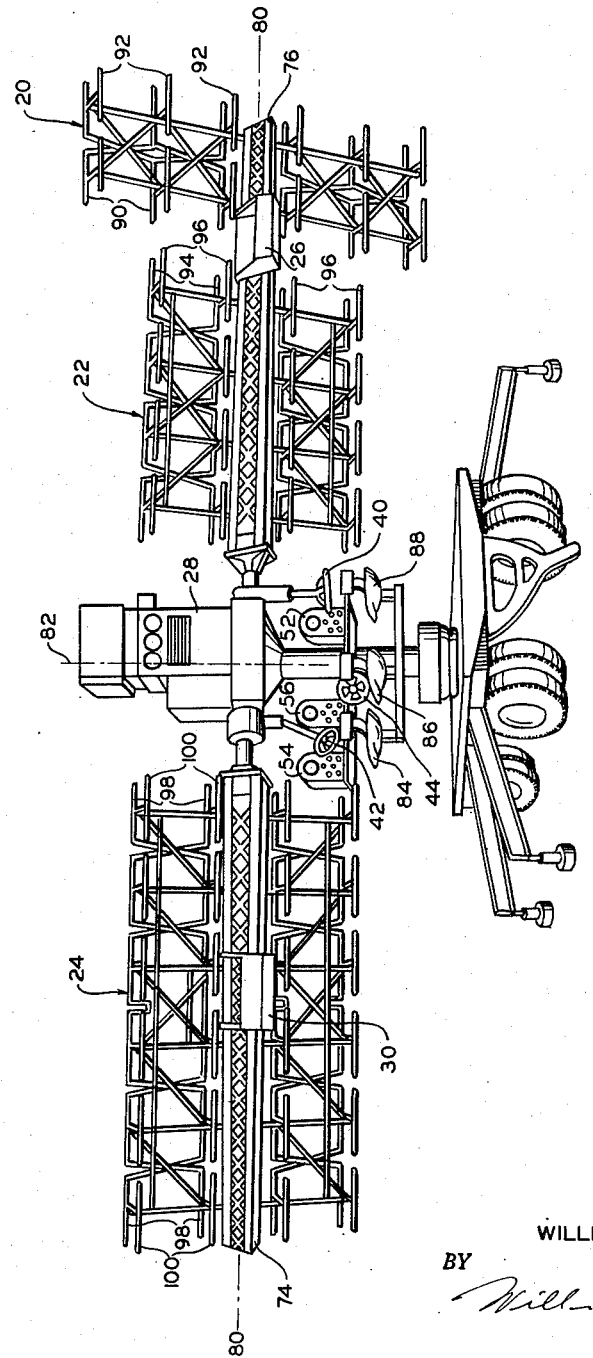

The complete unitary system is embodied in apparatus shown more in detail in Figure 4 to which reference is made along with the preceding figures. The antenna structures 20, 22 and 24 are assembled mechanically on horizontal arms 74 and 76 and are rotatable about a horizontal axis 80 by manual adjustment of an elevation handwheel 40. The entire antenna structure is also rotatable about a vertical axis 82 by manual adjustment of an azimuth handwheel 44. Handwheel 42 is geared to a phase shifter used for determining range. Figure 4 shows the antenna structure pointed slightly upward so as to display the general structural details.

Preferably, three operators, as shown in Figure 1, are required to manipulate the device. The operators are provided with seats 84, 86, and 88. The duty of each operator is to adjust one of the conveniently placed handwheels in accordance with indications he observes on the face of an oscilloscope located directly in front of his position as shown at 52, 54, and 56. By continuous adjustment of the azimuth and elevation handwheels, two of the operators keep the antenna array aimed directly at the airplane target in much the same way they would do if they were sighting a gun through azimuth and elevation telescopes. The third operator continuously keeps track of the range of the target in a manner to be hereinafter described. Thus, each operator determines one of the three parameters required by the gunners, that is, azimuth, altitude and range. Connected with each handwheel is a synchronous repeater or position transmitter (not shown) in the casing 28, which continuously and automatically transmits the handwheel positions and, therefore, the values of azimuth, altitude and range to similar devices at the gun positions.

Each of the three antenna structures used in this embodiment of my invention is an assembly of suitably spaced horizontal Hertz oscillators or dipoles. Each active dipole is provided with a corresponding reflecting dipole spaced one quarter wave length behind it in accordance with the practice of the art. The purpose of the reflecting dipoles, in the case of the transmitting antenna, is to project the radiation forward as a beam concentrated along an axis perpendicular to the plane of the array. The active dipoles on the transmitting array are indicated at 94 while the reflecting dipoles are shown at 96.

The receiving antenna arrays are indicated at 20 and 24. They are structurally similar to the transmitting array 22 but differ in dimensions. The elevation antenna 20 is designed with its greatest dimension vertical to give maximum directional sensitivity to variations in elevation. Azimuth antenna 24 is designed with its greatest dimension horizontal, to give maximum directional sensitivity to variations in azimuth. The active dipoles are shown at 90 and 98 for the elevation and azimuth antenna respectively while the reflecting dipoles are shown at 92 and 100 respectively.

The antenna arrangement shown in Fig. 4, which provides for the simultaneous motion of all antennae as a unit, possesses, as a consequence, an inherently enhanced directional sensitivity. This improvement in directional sensitivity arises from the combined or simultaneous action of the directional characteristics of the transmitting and receiving antennae and is lost if the receiving antenna alone is movable.

The advantage arising from the single mounting, giving simultaneous motion to transmitting and receiving antenna, is evident from Fig. 5. The transmitting antenna 22 sends out radiation having its maximum intensity along a lobe axis 102 perpendicular to the plane of the array. The lobe 104 of the transmitting antenna is drawn so that a vector 106, for example, intercepted by the lobe measures the radiation field intensity in the direction of the vector. If the target is in the direction of vector 106, this length measures the intensity of the radiation projected toward the target, and is less than in the direction 102. If the azimuth receiving antenna 24 moves with transmitting antenna 22, its directional lobe pattern 110 will be similar and parallel to the lobe pattern 104. Since the received signal must return over the same path in which it was sent, the intercepted length of the line 112 which is parallel to line 106, measures the strength of the received signal. Thus the intensity of the received signal diminishes when the target is off the directional axis for two reasons: first, because the radiation projected against the target is reduced in the proportion illustrated by the vectors 106 and 102, and secondly, because the efficiency of the receiving antenna is reduced in the similar ratio, 112 to 108, because the incoming wave fronts are not parallel to the plane of the antenna. The directional effects of the individual antenna are thus powerfully accentuated by being tied together so as to move as a unit.

The physical size and form of the antenna structure depends on the frequency used and this in turn depends on the transmitting and receiving tubes available for use at the very high frequencies desired. In general the higher the frequency used, the smaller and more compact the antenna structure, the actual design being a compromise between size and bulk of the antenna and the frequency limits of the tubes available. The particular structure shown in Fig. 4 was made to operate at a frequency of the order of 200 megacycles.

Referring now to Fig. 6, a synchronizing oscillator 34 provides a stable constant frequency source of sine wave alternating current. The output of this oscillator supplies the control voltage from which are derived the various wave forms necessary for the operation of the system. The oscillator frequency may be selected over a fairly wide range depending primarily on the effective maximum range of the radio locator. In one embodiment of the invention the selected frequency is of the order of 4000 cycles per second.

The output of the synchronizing oscillator is impressed on a pulse generator or keyer 32 which converts the sine wave into narrow, square-topped, positive pulses, which, after amplification, are applied to the input of a normally blocked transmitter 28. The transmitter becomes unblocked and generates a short train of powerful high frequency oscillations, each time it receives a pulse from the pulse generator, and this energy is radiated by the directional transmitting antenna 22.

The transmitted pulse radiation as well as the reflection by the distant object, as previously described, is received by the elevation antenna 20 and the azimuth antenna 24. After detection and amplification by the superheterodyne receivers indicated at 26 and 30, their output signals are applied to the vertical plates of an elevation oscilloscope 46 and an azimuth oscilloscope 50 respectively, where the received pulses produce visual images 60 and 64 on the screens 52 and 56 of the oscilloscopes 46 and 50 respectively. The range oscilloscope 48 is connected in parallel with elevation oscilloscope 46, where a corresponding screen image 62 on a screen 54 is shown, said screen representing the face of oscilloscope 48.

Synchronizing oscillator 34 is also connected to a sweep circuit 38 through a phase shifting device 36. The function of the sweep circuit is to provide excitation voltage, preferably of saw-tooth wave form, for the horizontal deflecting plates of all the oscilloscopes.

As previously stated, the received signal arrives at the receiver at a time later than the emission of the transmitted pulse by an amount equal to the time required for the signal to travel to and from the target. Since the sweep circuit advances the cathode spot horizontally at a uniform rate, the images of the received pulse are displaced on the screens from the images of the transmitted pulse a distance R, Figs. 3 and 6, corresponding to the slant range of the target.

A measurement of this distance is a measure of range. This can be accomplished by noting the position of the received pulse on a horizontal scale 53 etched on the glass face of the tube.

It is desirable however, to be able to transmit range information automatically to the gun positions. I have accomplished this by introducing a phase shifting circuit 36 between the oscillator and the sweep circuit, shown more in detail in Fig. 7. The phase of the sine wave voltage from oscillator 34 applied to the sweep circuit is progressively retarded by moving the range handwheel 42.

In the condition of initial or zero adjustment, the transmitted pulse 58, Fig. 7A, falls on the hair line 66, and the reflected signal or echo 62 falls to the right. As the phase is gradually retarded, the whole picture is moved to the left until the echo is brought to the hair line as shown in Fig. 7B. This shift in phase, and consequently the movement of the calibrated range handwheel 42 is a measure of range. The movement of the range handwheel indicated on a range dial 42-A is also transmitted automatically to the gun positions by a synchronous repeater 70 which is connected mechanically to the range handwheel shaft.

Since the sweep circuit is applied to all three oscilloscopes, shifting of the phase shifter 36 brings the received pulses on all three oscilloscopes to their respective vertical hair lines simultaneously thus apprising the elevation and azimuth operators of the echo-selecting operation performed by the range operator. The elevation operator, by adjusting the elevation handwheel 40, Fig. 6, and a shaft 41 adjusts the inclination of all antennae so as to obtain a maximum amplitude of the received pulse 60 as indicated on the vertical scale 66. The position of the elevation handwheel is then a measure of the angular elevation of the target indicated on an elevation dial 40-A and also transmitted to the gun positions by a repeater 68. In a similar manner the azimuth operator by adjusting the azimuth handwheel 44 moves the whole antenna structure about a vertical axis until the received pulse 64 becomes a maximum as observed on scale 66. The azimuth position indicated on an azimuth dial 44-A is also transmitted to the gun position by a repeater 72.

Many well known circuit arrangements can be used for shifting the phase of the sine wave voltage. In the circuits illustrated in Fig. 7, the sine wave voltage of the synchronizing oscillator 34 is applied through a transformer 119 across terminals 120 and 122 of a bridge network. Two circuits are bridged across these terminals, each consisting of a resistor in series with a condenser 126—124 and 128—130. The parameters of the networks are adjusted so that the capacitive reactance of each circuit is equal to its resistance, which makes each current to lead the applied voltage by 45°. Owing to the interchange in the relative positions of condenser and resistor in one branch, the potential across intermediate terminals 132 and 134 leads the applied voltage by 90°, as is well known in the art. A pair of contacts 136 and 138 sliding on resistors 126 and 130 can be used to shift the output voltage from zero to 90°. By the addition of a high resistance elements 140 and 142 in shunt with the respective condensers 124 and 128, the phase may be shifted through the entire 360°.

The schematic diagram of the pulse generator 32 of Fig. 6 is illustrated in Fig. 8. It converts the sine wave output of the synchronizing oscillator into short powerful pulses for modulating the transmitter. The synchronizing oscillator 34 utilizes a conventional pentode T1. The tube acts in a dual capacity, first as a conventional overdriven oscillator, in which the control grid and screen grid act as grid and plate, respectively, and, second, as an electron coupling device utilizing that portion of the electron stream which passes through the mesh of the screen grid in the plate circuit.

In this manner as approximately rectangular voltage wave 156 is produced at the plate, the current output of which has very little reaction on the oscillator tank circuit. The tank circuit sine wave voltage 150 is amplified by a synchronizing amplifier 152 and its output wave 154 is used for synchronizing the sweep circuit and the receiving channels with the transmitter. Voltage wave 156, appearing at the plate of tube T1, is applied to the control grid of a pentode through a coupling condenser 158, which is overdriven by the impressed signal so that the output of T2 is a substantially rectangular wave 160. Square wave 160 is applied to a differentiating resistance-capacity network 162—174 which produces differentiated pulses 164 and 166. These are impressed on a pentode T3 producing an almost vertical grid voltage rise. When plate voltage rise 160 reaches its limit, condenser 162 immediately discharges through resistors 172 and 174, allowing the grid voltage to return to its original value. Owing to the low capacity of condenser 162 this return is very rapid, the discharge curve appearing as an almost straight line. Similarly, when the square wave plate voltage falls abruptly, control grid voltage of T3 is carried almost vertically downward. The discharge curve returns the grid voltage to normal.

The negative bias 176 is sufficient to block the pulse generator tube T3, consequently no plate current flows during the period of the negative pulse, thus eliminating its effect from plate output. The positive grid pulse is sufficiently strong to carry the grid far beyond saturation giving rise to plate current curve 178 having a flat top and almost vertical sides. The plate potential of T3 falls almost to zero because of a large value plate resistor 182, producing a potential curve 180 having practically straight sides.

Tube T3 therefore generates a sharp negative voltage pulse having almost vertical sides, and the width of the pulse depends on the size of coupling condenser 162 and resistors 172 and 174. This pulse is suitably amplified and applied to the transmitter. The first pulse amplifier T4 has zero bias and therefore normally draws a large plate current. When its grid voltage is driven strongly negative through plate coupling condenser 184 as shown at 188, the plate current drops suddenly to zero as grid voltage passes cut off as shown at 190, the negative overswing beyond cutoff having no effect. When the grid voltage returns toward zero as at 189, the plate current remains zero until cut off is reached, when it suddenly rises to normal as shown at 191. Since the condition of tube T4 is normally conductive, the plate voltage is normally low because of drop in plate resistance 194 and results in a powerful positive voltage pulse 192. A second high gain stage in amplifier 196 produces the final pulse output voltage 198.

The method of applying the pulse output of the keyer to the transmitter is illustrated in Fig. 9. A high voltage condenser 200 is charged by a high voltage rectifier 202 through a choke 204 and a blocking diode 206 as shown. One or more high voltage modulator tubes, represented for simplicity by a single tube 208, is normally blocked by the large negative bias supplied by the keyer 32. One or more transmitting oscillator tubes indicated singly at 210, is connected with its cathode to a high voltage line 212, its plate being connected to ground, thus preventing conduction during the condenser charging period.

When the positive pulse 198 is applied to the grid of triode 208, the modulators immediately become conducting and provide a low resistance path to ground, thus momentarily grounding the positive terminal of condenser 200. Since the plates of the oscillator tubes 210 are also grounded with respect to D. C., thus causes the condenser to discharge through the transmitter, which accordingly emits a train of powerful oscillations. The choke coil 204 is provided to permit the positive condenser terminal to be momentarily grounded without at the same time shorting the high voltage rectifier.

The diode 206 is not conductive during discharge of the condenser, its purpose being to provide a charging path only. The D. C. voltage used in this case may be of the order of 15,000 volts; the pulse having an output of the order of 50 to 100 kw. and a duration of 8 or 9 microseconds is the result.

The transmitter itself is of the tuned plate, tuned grid and tuned cathode type, is not part of this invention, and needs no further description.

The sweep circuit indicated at 38, Fig. 6, converts the sine wave output of the phase shifter 36 into a saw-tooth voltage wave suitable for exciting the horizontal deflecting plates of the oscilloscopes. Synchronization of the saw-tooth generator with the transmitting channel may be obtained by using the pulse-generating circuit of Fig. 8, the output of which may be used for timing the discharge of the saw-tooth generating condenser in known manner. The slow charging period provides the uniformly rising voltage necessary for the horizontal deflecting plates.

In order to transmit azimuth, angular elevation and range to any desired distant location, synchronous repeaters indicated at 68, 70, 72 in Fig. 6 are used. These units permit the conversion of mechanical data into voltage relationships which may be transmitted by cable to any desired point where they are reconverted into mechanical data. These devices are well known in the art, one form of which is indicated diagrammatically in Fig. 10. Two rotors 230 and 232 excited from the same A. C. source 234 induce equal voltages in the corresponding section of their respective stators 236 and 238 when the mechanical positions of the rotors correspond. When the mechanical positions do not correspond, circulating currents flow between the corresponding stator sections through the connecting cable 240 which causes the receiving rotor to follow quickly and smoothly the slightest movement imparted to the transmitting rotor.

There has been described a method and means for the determining of the bearing and range of remote objects in space characterized by intermittent transmission of energy waves and alternate reception of echoes of said waves at a single location. Because of the intermittent nature of said transmission, the receiver is permitted to regain sufficient sensitivity to detect the relatively minute amounts of energy reflected by the target. The alternate transmission and reception is accomplished under the control of a synchronizing oscillator which causes a transmitter to be intermittently pulsed; each pulse controls the generation of a saw-tooth wave which displaces the beam of a cathode-ray oscilloscope along one coordinate to generate a timing trace, the zero time of the trace thus coinciding with the zero time of the transmitted pulse. Both the transmitted pulse and the echo successively displace said trace along another coordinate, at right angle to the first coordinate, to provide two indications separated by a distance which is a function of the range of the target. By means of an adjustable phase shifting type of ranging circuit the time and trace of the oscilloscope is shifted to bring the echo indication to a predetermined position on the oscilloscope screen, which position may be the center hairline of the screen. Calibrations on the adjusting means of the phase shifter then provide an indication of the range of the target.

The transmitting and receiving antennas are directional and simultaneously oriented toward the target to greatly enhance the signal-to-noise ratio. Under manual control the antennas are oriented in both azimuth and elevation until maximum echo energy is received, as indicated on the oscilloscopes. These bearing orientations, as well as the adjustments of the range phase shifter are transmitted to a gun position to simultaneously orient the gun toward the target or to provide appropriate data to enable such gun orientation.

Although one embodiment of my invention has been described in detail, it will be obvious to those skilled in the art that various changes and modifications may be made therein without departing from the true spirit and scope of the invention, and it is aimed in the appended claims to cover all such changes and modifications.

I claim:

1. The method of determining the direction of relatively small distant objects in space which comprises, the steps of directionally transmitting from a given location short pulses of radio energy separated by comparatively long intervals, directionally receiving at said location during said intervals pulse echoes of energy reflected from said objects substantially along the path of transmission of said pulses, converting echoes reflected from objects at different distances into indications that show the delays in reception of said echoes relative to the transmission of said pulses, and varying the direction of transmission and reception in the same sense to determine the actual direction of at least one of said objects.

2. The method of determining the direction of distant objects that are above the surface of the earth which comprises, the steps of directionally transmitting from a given location short pulses of radio energy separated by comparatively long intervals, directionally receiving at said location during said intervals pulse echoes of energy reflected from said objects substantially along the path of transmission of said pulses, discriminating between echoes reflected from objects at different distances in accordance with the time delays in reception of said echoes relative to the transmission of said pulses, and varying the direction of transmission and reception in the same sense, separately detecting the echoes received for different orientations of the path of transmission and reception, and converting the detected echoes received from a single distant object into an indication of the presence of the object whereby the direction of the distant object is indicated by the direction of transmission and reception at the time the presence of the object is indicated.

3. The method of determining the direction of relatively small distant objects in space which comprises, directionally transmitting from a given location short pulses of radio energy separated by comparatively long intervals, directionally receiving at said location during said intervals pulse echoes of energy reflected from said objects substantially along the path of transmission of said pulses, distinguishing between echoes reflected from objects at different distances in accordance with the delays in reception of said echoes relative to the transmission of said pulses, simultaneously varying the direction of transmission and reception in the same sense and determining the actual direction of one of said objects from the direction of transmission and reception at the time echoes are received from that object.

4. The method of determining the direction and distance of objects that are above the surface of the earth which comprises, directionally transmitting from a given location short pulses of radio energy separated by comparatively long intervals, directionally receiving at said location during said intervals pulse echoes of energy reflected from said objects substantially along the path of said transmitted energy, distinguishing between echoes reflected from objects at different distances in accordance with the delays in reception of said echoes relative to the transmission of said pulses, varying the direction of said transmission and reception in the same sense to reveal the direction of the object in accordance with the amplitude of echoes therefrom, and measuring the delays in reception of said echoes relative to the transmission of said pulses.

5. Apparatus for determining the direction and distance of objects that are above the surface of the earth with respect to a given location comprising an antenna system having a directional characteristic for transmitting and receiving at the same location, means connected to said antenna system for generating short pulses of radio energy separated by comparatively long intervals, means connected to said antenna system for detecting during said intervals pulse echoes of energy reflected from said objects substantially along the path of transmission of said pulses, means for distinguishing between echoes reflected from objects at different distances in accordance with the time delays in reception of said echoes relative to the transmission of said pulses, means for varying the direction of transmission and reception simultaneously in the same sense, and means for indicating the relative amplitude of pulse echoes received from one of said objects as the direction of transmission and reception is varied and for measuring said time delays.

6. An apparatus for determining the direction and distance of relatively small objects in space comprising, a radio transmitter provided with a directional antenna, means for energizing said transmitter to emit short pulses of radio energy separated by comparatively long intervals, a radio receiver located immediately adjacent to said transmitter, a directional antenna for said receiver for receiving pulse echoes of energy reflected from said objects substantially along the path of said transmitted energy, means fed by said receiver for distinguishing between echoes reflected from objects at different distances in accordance with the delays in reception of said echoes relative to the emission of said pulses and for measuring said delays, and means for varying the direction of transmission and reception simultaneously in the same sense to obtain the maximum amplitude of echoes from one of said objects.

7. Apparatus for determining the direction and distance of objects that are above the surface of the earth with respect to a given location comprising, an antenna system having a directional characteristic for transmitting and receiving at the same location, means connected to said antenna system for generating short pulses of radio energy separated by comparatively long intervals, means connected to said antenna system for detecting during said intervals pulse echoes of energy reflected from said objects substantially along the path of transmission of said pulses, means cooperating with the antenna system for varying the direction of transmission and reception simultaneously in the same sense, and means for indicating the relative amplitude of said pulse echoes as the direction of transmission and reception is varied and for measuring the time delay between the transmission of said pulses and the reception of said echoes.

8. Apparatus for determining the direction of distant objects comprising, an antenna system having a directional characteristic for transmitting and receiving at the same location, means connected to said antenna system for generating short pulses of radio energy separated by comparatively long intervals, means connected to said antenna system for detecting during said intervals pulse echoes of energy reflected from said objects substantially along the path of transmission of said pulses, means for separately indicating echoes reflected from objects at different distances in accordance with the time delays in reception of said echoes relative to the transmission of said pulses, and means for adjusting the direction of transmission and reception simultaneously in the same sense.

9. Apparatus for determining the direction of distant objects with respect to a given location comprising, a radio transmitter at said location, means for alternately energizing said transmitter for a short period of time and deenergizing said transmitter for a longer period of time, a radio receiver located adjacent to said transmitter for receiving pulse echoes of energy reflected from said objects, a directional antenna connected to said transmitter, a directional antenna connected to said receiver, said antennas being oriented to transmit and receive along substantially the same path, means for distinguishing between echoes reflected from objects at different distances in accordance with the time delays in reception of said echoes relative to a period of energization of said transmitter, and means for adjusting the orientation of both of said antennas simultaneously in the same sense to determine the actual direction of one of said objects.

10. Apparatus for determining the direction and distance of relatively small objects in space with respect to a given location comprising, an antenna system having a directional characteristic for transmitting and receiving at the same location means connected to said antenna system for generating short pulses of radio energy separated by comparatively long intervals, means connected to said antenna system for detecting during said intervals pulse echoes of energy reflected from said objects substantially along the path of transmission of said pulses, means for distinguishing between echoes reflected from objects at different distances in accordance with the time delays in reception of said echoes relative to the transmission of said pulses, and for measuring said time delays to determine the distance of said objects, said antenna system being highly directional in azimuth and less directional in elevation whereby it emits a sheet of radiations, and means for rotating said antenna system about a vertical axis that passes within the plane of said sheet whereby at each angle of rotation outgoing pulses strike objects within a wide range of elevations that have the same azimuth as said sheet but not objects of substantially different azimuth from that of the sheet.

11. The method of determining the direction of distant objects that are above the surface of the earth which comprises, the steps of directionally transmitting from a given location short pulses of radio energy separated by comparatively long intervals, directionally receiving at said location during said intervals pulse echoes of energy reflected from said objects substantially along the path of transmission of said pulses, distinguishing between echoes reflected from objects at different distances in accordance with the time delays in reception of said echoes relative to the transmission of said pulses, varying the direction of transmission and reception of said pulses, and indicating the direction of said transmission and reception.

12. Apparatus for determining the direction of relatively small distant objects in space which comprises, a movable antenna system having a directional characteristic for transmitting and receiving at the same location, means connected to said antenna system for generating short pulses of radio energy separated by comparatively long intervals, means connected to said antenna system for detecting during said intervals pulse echoes of energy reflected from said objects substantially along the path of transmission of said pulses, and means for distinguishing between echoes reflected from objects at different distances in accordance with the time delays in reception of said echoes relative to the transmission of said pulses.

13. The method of determining the direction and distance of objects with respect to a given location which comprises, the steps of directionally transmitting from said location short pulses of radio energy separated by comparatively long intervals, directionally receiving at said location during said intervals pulse echoes of energy reflected from said objects substantially along the path of transmission of said pulses, whereby spaced echoes will be reflected from objects at different distances in accordance with the time delays in reception of said echoes relative to the transmission of said pulses, varying the direction of transmission and reception in the same sense, indicating the direction of transmission and reception, and measuring said delays to determine the actual distance of said objects.

14. Apparatus for determining the direction and distance of objects with respect to a given location comprising, a movable antenna system having a directional characteristic for transmitting and receiving at the same location, means connected to said antenna system for generating short pulses of radio energy separated by comparatively long intervals, means connected to said antenna system for detecting during said intervals pulse echoes of energy reflected from said objects substantially along the path of transmission of said pulses, and means for distinguishing between echoes reflected from objects at different distances in accordance with the time delays in reception of said echoes relative to the transmission of said pulses and for measuring said time delays.

15. In a device for indicating range and direction of a remote object that is above the surface of the earth, a rotatable directional antenna system for transmitting energy toward and receiving energy from the remote object, a radio transmitter for supplying to said antenna system a series of short pulses of radio frequency energy separated by intervals which are long compared to the duration of the pulses a radio receiver connected to said antenna system for detecting any of said energy that is reflected by the object and returned to the antenna system as pulse echoes, and indicating means fed by said receiver for distinguishing the echoes due to the remote object from those due to closer objects and for indicating the range and direction of the remote object, said indicating means including means for deriving its directional indications from the angular position of the antenna system at the time of reception of echoes from the remote object and also for indicating the time interval between the outgoing pulses and the echo pulses received from the remote object.

16. A device for determining the direction of a remote object as defined in claim 12 in which said antenna system is highly directional in a first plane and relatively non-directional in a second plane perpendicular to said first plane, and means for rotating said antenna system about an axis that intersects said first plane and passes within said second plane.

17. Apparatus for determining the direction of relatively small distant objects in space comprising, a movable antenna system having a directional characteristic for transmitting and receiving, at the same location, means connected to said antenna system for generating short pulses of radio energy separated by comparatively long intervals, means connected to said antenna system for detecting during said intervals pulse echoes of energy reflected from said objects substantially along the path of transmission of said pulses, means for varying the direction of transmission and reception simultaneously in the same sense, and means for indicating the relative amplitude of pulse echoes received from one of said objects as the direction of transmission and reception is varied and for distinguishing between echoes reflected from objects at different distances in accordance with the time delays in reception of said echoes relative to the transmission of said pulses.

18. The method of determining the direction of distant objects which comprises, the steps of directionally transmitting from a given location short pulses of radio energy separated by comparatively long intervals, directionally receiving at said location during said intervals pulse echoes of energy reflected from said objects substantially along the path of transmission of said pulses, distinguishing between echoes reflected from objects at different distances in accordance with the delays in reception of said echoes relative to the transmission of said pulses, indicating the presence of echoes reflected by at least one distant object, and varying the direction of transmission and reception in the same sense to determine the actual direction of at least one of said objects.

19. The method of determining the direction of a distant object which comprises, the steps of directionally transmitting from a given location short pulses of radio energy separated by comparatively long intervals, directionally receiving at said location during said intervals pulse echoes of energy reflected from said object substantially along the path of transmission of said pulses, distinguishing between the echoes reflected from objects at different distances in accordance with the time delays in reception of said echoes relative to the transmission of said pulses, varying the direction of transmission and reception in the same sense, and separately detecting the echoes received for different orientations of the path of transmission and reception.

20. Apparatus for determining the direction of distant objects comprising, an antenna system having a directional characteristic for transmitting and receiving at the same location, means connected to said antenna system for generating short pulses of radio energy separated by comparatively long intervals and for detecting during said intervals pulse echoes of energy reflected from said objects substantially along the path of transmission of said pulses, means for distinguishing between echoes reflected from objects at different distances in accordance with the time delays in reception of said echoes relative to the transmission of said pulses, and means for adjusting the direction of transmission and reception simultaneously in the same sense.

21. Apparatus for determining the direction and distance of objects with respect to a given location comprising, an antenna system having a directional characteristic for transmitting and receiving at the same location, means connected to said antenna system for generating short pulses of radio energy separated by comparatively long intervals and for detecting during said intervals pulse echoes of energy reflected from said objects substantially along the path of transmission of said pulses, means for distinguishing between echoes reflected from objects at different distances in accordance with the time delays in reception of said echoes relative to the transmission of said pulses and for measuring said time delays to determine the distance of said objects, and means for varying the direction of transmission and reception simultaneously in the same sense to determine the actual direction of said objects.

22. The method of determining the direction of distant objects which comprises, the steps of directionally transmitting from a given location short pulses of radio energy separated by comparatively long intervals, directionally receiving at said location during said intervals pulse echoes of energy reflected from said objects substantially along the path of transmission of said pulses, and distinguishing between the echoes reflected from objects at different distances in accordance with the time delays in reception of said echoes relative to the transmission of said pulses.

23. Apparatus for determining the direction of distant objects which comprises, a movable antenna system having a directional characteristic for transmitting and receiving at the same location, means connected to said antenna system for generating short pulses of radio energy separated by comparatively long intervals and for detecting during said intervals pulse echoes of energy reflected from said objects substantially along the path of transmission of said pulses, and means for distinguishing between echoes reflected from objects at different distances in accordance with the time delays in reception of said echoes relative to the transmission of said pulses.

24. In a radio ranging system having a high frequency oscillator tube and circuit, said tube having a control element adapted, in response to an applied potential, to start and stop oscillations in said circuit, a keying circuit adapted to produce periodically potential impulses of peaked wave form, means applying said potential impulses to said oscillator control element, a cathode ray tube indicator with a scale having a zero position, means providing a sweep potential for periodically deflecting the cathode beam with reference to said zero position in accordance with a time function, and electrical means for controlling the phase relation between said peaked potential impulses and said sweep potential whereby the time of impulse transmission can be synchronized with the cathode beam's traverse of said zero position.

25. In a radio ranging system having a signal impulse transmitter, an electronic device adapted to produce periodically impulses of peaked wave form, means for impressing said peaked impulses upon said transmitter for the control thereof, an indicator having an indicating element, a source of periodic sweep potential operatively connected to said indicator for the control of the position of said indicating element, and means for controlling the time relation between said peaked impulses and said sweep potential.

26. In a radio ranging system, a high frequency pulse transmitter, a high frequency pulse receiver, means for producing periodically a keying impulse of peaked wave form for controlling the transmitter to transmit pulses periodically, an indicator having an indicating element for indicating by the position of said element the time interval between transmitted and received pulses, means for applying a potential to said indicator for controlling the position of said element in accordance with a time function and adjustable electrical phase controlling means for adjusting the time relation between said keying impulse and said indicator controlling potential.

27. In a radio ranging system, an indicator having an indicating element, means providing a sweep frequency timing potential operatively associated with the indicating element for controlling the position of the indicating element, means providing a signaling impulse, means providing a peaked potential controlling the emission of the signaling impulse, and phasing means for controlling the phase relation of the peaked potential with respect to the sweep frequency.

References Cited in the file of this patent

UNITED STATES PATENTS

| Number | Name | Date |
|---|---|---|
| 1,471,547 | Chilowsky | Oct. 23, 1923 |
| 1,585,591 | Lowy | May 18, 1926 |
| 1,924,156 | Hart | Aug. 29, 1933 |
| 1,924,174 | Wolf | Aug. 29, 1933 |
| 1,945,952 | Nicolson | Feb. 6, 1934 |
| 1,979,225 | Hart | Oct. 30, 1934 |
| 1,982,271 | Turner | Nov. 27, 1934 |
| 2,003,661 | Bassett et al. | June 4, 1935 |
| 2,075,708 | Fliess | Apr. 6, 1937 |
| 2,077,707 | Melton | Apr. 30, 1937 |
| 2,134,716 | Gunn | Nov. 1, 1938 |
| 2,143,035 | Smith | Jan. 10, 1939 |
| 2,176,469 | Moueix | Oct. 17, 1939 |
| 2,193,361 | Rice | Mar. 12, 1940 |
| 2,211,404 | Braden | Aug. 13, 1940 |
| 2,231,929 | Lyman | Feb. 18, 1941 |
| 2,237,193 | Mobsby | Apr. 1, 1941 |
| 2,345,932 | Gould | Apr. 4, 1944 |
| 2,357,398 | Gray | Sept. 5, 1944 |
| 2,399,426 | Bradley | Apr. 30, 1946 |
| 2,399,726 | Doyle et al. | May 7, 1946 |
| 2,407,273 | Hart | Sept. 10, 1946 |
| 2,409,456 | Tolson | Oct. 15, 1946 |
| 2,412,631 | Rice | Dec. 17, 1946 |
| 2,513,279 | Bradley | July 4, 1950 |
| 2,597,013 | Marchetti | May 20, 1952 |

FOREIGN PATENTS

| Number | Country | Date |
|---|---|---|
| 13,170 | Great Britain | June 10, 1904 |
| 108,556 | Australia | Sept. 14, 1934 |
| 784,425 | France | July 22, 1935 |
| 455,765 | Great Britain | Oct. 27, 1936 |
| 111,594 | Australia | Mar. 19, 1939 |
| 552,072 | Great Britain | Mar. 22, 1943 |
| 555,052 | Great Britain | Aug. 3, 1943 |

OTHER REFERENCES

"A Test of the Existence of the Conducting Layer," by Breit and Tuve, published in the Physical Review, September 1926, vol. 28, pages 554–575.